Patented Nov. 16, 1943

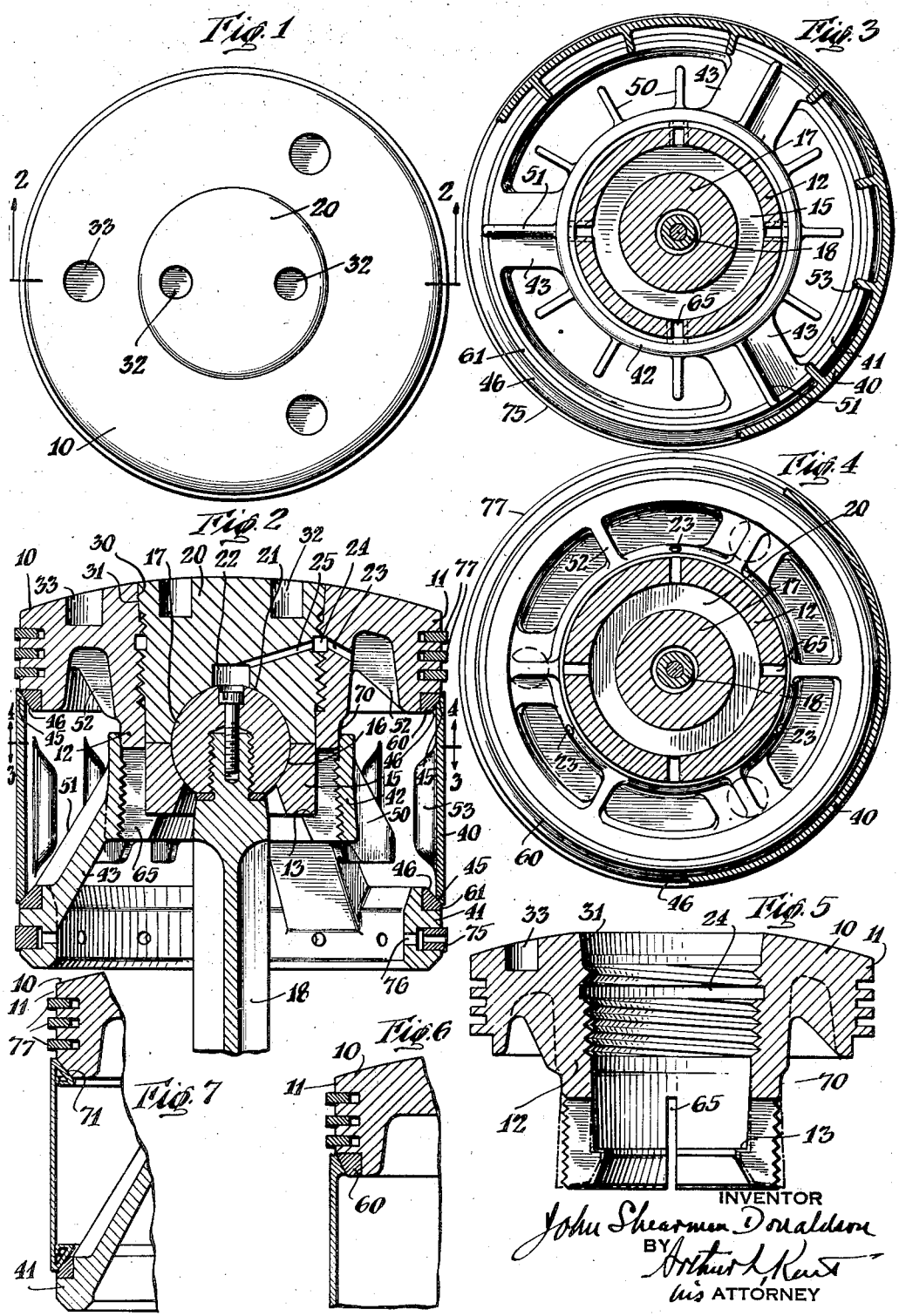

2,334,318

UNITED STATES PATENT OFFICE 2,334,318

PISTON

John Shearman Donaldson, St. Albans, N. Y., assignor to Donaldson Piston Corporation, New York, N. Y., a corporation of New Jersey Application January 13, 1940, Serial No. 313,676

21 Claims. (Cl. 309—15)

This invention relates to pistons, and more especially to pistons for internal combustion engines. The invention aims generally to provide an improved piston which shall be highly efficient, of low oil consumption, very strong and rigid, and of long life and easy serviceability.

Particular objects of the invention are: to provide an improved piston of which the skirt is formed separately from the head portion of the piston, permitting the head portion to be made of light weight metal of comparatively high thermal conductivity even though such metal has a comparatively high coefficient of expansion, such as an aluminum alloy or the magnesium alloy known as Dow metal or other magnesium alloy, and the skirt to be made either of a metal of comparatively low coefficient of expansion, such as steel or a steel alloy, or of a light-weight metal such as an aluminum or magnesium alloy; to provide in a piston having a removable and replaceable skirt a very high degree of rigidity between the skirt and the head portion of the piston; to control the temperature of the skirt in operation by limiting the conduction of heat thereto and by extraction of heat therefrom, thereby making possible the use of a so-called solid, or unslotted, that is, circumferentially continuous, skirt fitted more closely in the cylinder than has heretofore been found possible with skirts of like material; to provide a piston having a skirt which is of slightly greater diameter at its two ends than at intermediate points in its length; and to provide means whereby a circumferentially solid skirt may to a limited degree be adjustably expanded at its end portions either to make up for wear or to fit the skirt to cylinders of slightly different sizes.

To these ends, a piston embodying the invention in the form now considered best comprises a head portion having a ring-carrying part and a downwardly extending part of reduced diameter provided with connecting rod bearings, and has a circumferentially continuous skirt clamped between the ring-carrying part of the head portion and an annular clamping member which engages the lower edge of the skirt and which is carried by an internally threaded sleeve, or nut, screwed on to the lower portion of the downwardly extending part of the head portion by means of spaced legs or other connecting means formed to permit oil or other cooling fluid to splash therebetween. The annular skirt-clamping part is also most desirably grooved to receive an oil ring. The piston has most desirably a ball- and-socket type bearing connection between it and the connecting rod, a ball on the end of the connecting rod being seated between upper and lower bearing members in the downwardly extending part of the head portion, such part being of tubular form.

For locking the internally threaded sleeve which carries the skirt-clamping member in its position of adjustment on the threaded lower portion of said downwardly extending part, the lower end portion of said downwardly extending part is slotted vertically so as to be capable of slight contraction and expansion, and the threaded sleeve and the externally threaded lower portion of said downwardly extending part are so formed and of such relative size that when the sleeve is screwed on to its skirt-clamping position and the lower bearing member for the ball head of the connecting rod is thereafter forced into position within said downwardly extending part, the lower threaded portion of such part is forced out into locking engagement with the threaded sleeve. In order to make this locking more positively secure, the threaded sleeve increases in internal diameter downwardly with a slight taper and the threaded lower portion of the tubular part similarly increases in external diameter downwardly with a slight taper when expanded by the lower bearing member.

The skirt has its two end edges bevelled off on the inside to provide inclined bearing faces, and the ring-carrying part of the head and the annular clamping member have annular inwardly inclined bearing faces for engaging such bearing faces of the skirt. Because of these co-acting inclined bearing faces, the skirt is accurately positioned concentrically with the head portion of the piston when clamped between the ring-carrying part of the head portion and the clamping member, and by continued screwing inward of the clamping member after the skirt has been clamped in position, the end portions of the skirt, unless made too rigid, may be expanded slightly so that the skirt thus rigidly connected with relation to the head portion of the piston will have its closest spacing from the cylinder wall at and near its two ends, with its intermediate portion, however, of only slightly less diameter than its end portions so that throughout its whole length the skirt, fitted closely within the cylinder, serves as an efficient oil and compression seal. Also, if after long use it has become desirable to increase slightly the effective diameter of the skirt, this may be accomplished by slight further inward adjustment of the clamping member. Also, this adjustment makes it possible to fit a given piston to cylinders of slightly varying sizes.

Because of its being rigidly supported at both ends, the skirt may be, and most desirably is, made substantially thinner than has been customary. The skirt is thus not only of comparatively light weight, but its mass is reduced relatively to its heat discharging surface. The most suitable thickness of the skirt will depend, of course, on the strength of the material of which it is made.

Because of the break in continuity of metal between the skirt and the parts between which it is clamped, the conduction of heat from the head portion of the piston to the skirt is largely reduced, and because of the free access of splashed oil to the inside of the skirt and the relative thinness of the skirt, comparatively good cooling of the skirt is secured. The maximum operating temperature and resulting expansion of the skirt are thus reduced, and because of this the skirt may be fitted with a much closer clearance from the cylinder wall than has heretofore been found practical with the so-called solid skirts of like material, with resulting improved oil and compression sealing. And the closer fitting of the skirt results in a better transfer of heat from the skirt to the cylinder wall when the skirt is hotter than the cylinder wall. It is probably because of the lower operating temperature of the skirt of the improved piston that it has been found possible that solid skirts of light weight metal of high coefficient of expansion may be fitted with a closer clearance than has heretofore been found practical without causing any trouble as the result of skirt expansion.

Because of the inclined bearing faces of the skirt and of the parts between which it is clamped, the tendency of the expansion of the ring-carrying part of the head portion as it becomes heated in operation to expand the upper end of the skirt is compensated for by the axial expansion of said central downwardly extending part and of the lower portion of the piston comprising the skirt-clamping member and the threaded sleeve and connecting legs, the degree of such compensation depending on the particular angle of the bearing faces. This angle, in order to avoid substantial variation in the clamping pressure on the skirt under temperature variations, is varied according to the difference in coefficient of expansion of the materials of which the head portion and lower portion of the piston and the skirt are made, and according to the relative length of the mean distance between the annular inclined bearing faces of the ring-carrying part and of the skirt-engaging member as compared to the mean diameter of said annular bearing faces, and according to the difference in operating temperature of the skirt and of those parts of the head and lower portions of the piston which are opposite the skirt. The lower the coefficient of expansion of the skirt as compared to the coefficient of expansion of the head portion and lower portion of the piston, and the greater the mean diameter of said annular bearing faces as compared to the length of the mean distance between them, and the lower the operating temperature of the skirt as compared to the operating temperature of said parts of the head portion and lower portion of the piston, the smaller should be the acute angle of said bevelled bearing faces measured from a plane normal to the axis of the piston.

Because of the close fit of the skirt, and especially of the end portions of the skirt, in the cylinder bore and of the very rigid connection of the skirt to the ring-carrying head of the piston, and of the comparatively light weight of the piston as a whole, a highly efficient engine operation is secured through long periods of use. The ring-carrying part of the piston is accurately guided, and cocking with resulting piston slap and uneven wear and rounding of the piston rings with resulting passing of oil and loss of vacuum and compression and power are, to an exceedingly high degree, reduced. It is well known that with the pistons commonly in use there is comparatively great loss of engine power due to cocking of the pistons and the resulting ring and piston wear, and that this loss of power is aggravated by the passing of an excessive amount of oil which in turn results in carbon formation, causing further loss of power, and in extreme cases, pre-ignition.

Although it is greatly preferred to make the piston of the type having a ball-and-socket connection with the piston rod, both because of the inherent advantages of this type of connection over the commonly used wrist pin connection and because the piston of this type lends itself more advantageously to embodiment of the features of the present invention, and although a piston of this type made according to the invention forms in itself a feature of the invention, yet certain features of the invention may with advantage be embodied in pistons of the type having a wrist pin connection with the connecting rod. It is also to be understood that pistons according to the invention may be made of practically any desired and suitable material, although it is one of the outstanding advantages of the invention that the head portion and the lower clamping portion, and also, if desired, even the skirt, may be made of the comparatively light metals such as aluminum and magnesium alloys.

The invention will be more fully understood from the following detail description in connection with the accompanying drawing, in which:

Fig. 1 is a plan view of the head end of a piston of approved construction according to the invention;

Fig. 2 is a section taken on line 2—2 of Fig. 1;

Fig. 3 is a horizontal section of the piston looking in the direction of the arrows 3—3 taken on the line from which the arrows extend;

Fig. 4 is a section looking in the direction of the arrows 4—4 of Fig. 2 taken on the same line;

Fig. 5 is a section of the head portion of the piston standing by itself; and

Figs. 6 and 7 are fragmentary sectional views taken on line 2—2 of Fig. 1 showing certain modifications.

Referring first to Figs. 1 to 5, the head portion of the piston is of cast metal and comprises an annular top part 10 having a ring-carrying apron, or part, 11, and a downwardly extending central body part 12 which when the piston is to be connected to the connecting rod by a ball-and-socket joint, as shown, is a tubular part the bore of which extends upward through the top of the piston head. This tubular body part is the bearing-carrying part of the piston and it is of substantially smaller diameter than the skirt. At its lower end this tubular body part 12 has an inside shoulder 13 on which is seated an annular lower bearing member 15 which fits in the bore of the tubular part and the inner surface 16 of which is spherically curved to fit the ball 17 detachably secured on the end of a connecting rod 18 to which the piston is to be connected. The opening in the bottom of the bearing member is of sufficient size to permit the necessary oscillation of the connecting rod. Above the bearing member 15 the bore of the tubular part 12 is threaded to receive a threaded upper bearing member 20 which has a spherically curved bearing surface 21 to engage an upper half of the connecting-rod ball when seated on the lower bearing member. An oil pocket 22 extends upward from the top of the bearing surface 21, and oil splashed within the piston passes through passages 23 in the wall of the tubular body part to a circumferential oil groove 24 and thence through passages 25 to the pocket 22, only one of the passages 23 being shown. The upper bearing member 20 is of such depth, or vertical length, that when screwed down into position its top surface is substantially flush with the adjacent surface of the piston head, which may be somewhat convex as shown, and, as shown, the upper bearing member is made of a single integral piece of metal although it might, obviously, be made up of two or more pieces.

An annular portion, or zone, 30 of the peripheral surface of the upper bearing member, most desirably at the top thereof as shown, is unthreaded, and a corresponding annular portion, or zone, 31 of the bore of the tubular part 12 into which the bearing member is screwed is also unthreaded, and these smooth annular faces 30 and 31 are of such relative size and extend in such direction axially that when the upper bearing member is screwed into the tubular part 12 these annular surfaces come into engagement somewhat before the upper bearing member has been screwed in to its seated position, and that as the upper bearing member is thereafter screwed further in to seat against the lower bearing member, these two coacting surfaces wedge tightly together with a force sufficient to slightly to upset the adjacent metal of one or both of the engaging bodies, thus securely locking the two bearing members in position in the tubular part 12 and forming a seal against loss of compression and against introduction of carbon from the top of the piston to the connecting rod bearing surfaces.

In order to give wrench hold, two wrench pin sockets 32 are provided in the top face of the upper bearing member, and to hold the piston against turning while the upper bearing member is being turned to remove it or to screw it in to position the top part 10 is also provided with wrench recesses 33.

The foregoing parts as so far described form in themselves no part of the present invention, and the patentable subject matter thereof is covered in my Patent Serial No. 2,297,649, September 29, 1942, as a continuation-in-part of my original application Serial No. 51,782.

A short piece of tubing formed separately from the head portion 10 serves as the guiding member, or skirt, of the piston. This skirt 40 is clamped between the ring-carrying part 11 and an annular member 41 which is carried by an internally threaded sleeve, or nut, 42 screwed on to the lower part of the tubular part 12, the member 41 being connected to the sleeve by legs 43 spaced to give free access of splashed oil or other cooling fluid to the space within the skirt, three such legs being most desirably provided as shown.

The skirt is circumferentially continuous, that is, it is an unslotted or so-called solid skirt, and for best results, as I now believe, it is imperforate although it may, with some loss of efficiency, be skeletonized with symmetrically arranged openings therethrough. The two end edges of the skirt are bevelled off on the inside to provide inwardly facing inclined bearing faces 45 to engage annular inwardly inclined bearing faces 46 on the ring-carrying part 11 and the clamping member 41. Because of these inclined bearing faces of the skirt and the parts between which it is held, not only is the skirt rigidly connected to the head portion of the piston, but, as before pointed out, it is accurately positioned concentrically with the head portion, and by inward adjustment of the member 41 the end portions of the skirt, unless made too rigid, may be expanded slightly with relation to its intermediate portions so that the skirt will be of slightly greater diameter at its ends than at its intermediate portions, such expansion of the skirt making it possible to refit the piston to the cylinder after wear resulting from use, and also to fit a given piston to cylinders of slightly varying sizes. The extent to which the skirt may be expanded will depend on its rigidity as determined by the material of which it is made and its thickness. A Dow metal skirt, for example, has the advantage that it can be expanded more than a considerably thinner steel skirt.

Cooling fins 50 are desirably provided on the threaded sleeve 42, and the legs 43 are made with cooling and strengthening fins 51. Cooling and strengthening fins 52 are also desirably provided at circumferentially spaced intervals across the channel between the ring-carrying apron or part 11 and the upper end of the tubular part 12. It is sometimes desirable, also, to provide the skirt with a plurality of circumferentially spaced axially extending cooling fins 53.

The head portion of the piston and the lower portion, comprising the clamping member 41, sleeve 42 and legs 43, may be cast or otherwise made of any suitable material, but for the sake of lightness and good thermal conductivity, they are most desirably made of Dow metal or other suitable magnesium or aluminum alloy. Each of these two portions of the piston may be, and most desirably are, die cast. The bearing members 15 and 20 are also most desirably made of Dow metal or other suitable light weight alloy having good wear-resisting and smooth surface properties.

The skirt may be made of a suitable steel or steel alloy or of a light-weight metal such as Dow metal, or of other suitable material. Because of the manner in which the skirt is rigidly supported at both ends, it may be, and most desirably is, made substantially thinner than piston skirts of like material are customarily made, and for reasons heretofore pointed out, the skirt may be fitted with a substantially closer clearance from the cylinder wall than has heretofore, so far as I am aware, been found practical. This possibility of closer fitting of the skirt is especially noticeable and of special advantage when the skirt is made of a light-weight metal of high coefficient of expansion. Dow metal skirts without cooling fins of pistons according to the invention may be fitted with a clearance of substantially less than .001 of an inch for each inch of diameter, and steel skirts may be fitted somewhat closer than Dow metal skirts. The skirt may be simply a short piece of rolled or otherwise formed tubing having its ends bevelled as shown in Fig. 2 and may, of course, be without any fins. If provided with fins as shown in Figs. 2 and 3, the fins may be welded to the skirt wall or the skirt may be die cast with integral fins.

When the head portion 10 and the skirt clamping member 41 are made of relatively soft or light-weight metal, their annular bearing faces 46 are most desirably formed on rings 60 and 61 of steel or other hard wear-resisting metal set into the lower periphery of the head portion and the upper periphery of the member 41, respectively, the rings being most desirably shrunk into recesses formed in the head portion and clamping member. The bearing faces formed on these set-in rings are more wear-resistant than bearing faces formed directly on the light-weight metal, and even when the skirt is of Dow metal or other light-weight metal, it is desirable to have such more wear-resistant bearing faces on the head portion and clamping member so that these bearing faces shall remain in good condition for skirt replacement.

A further advantage of these bearing rings of strong hard metal set into the ring-carrying part and skirt-clamping member of light-weight metal is that by reason of their lower coefficient of expansion and relatively great strength they resist to a substantial degree the otherwise greater expansion of the parts into which they are set.

For locking the sleeve 42 in adjusted position on the tubular member 12, the tubular member has a suitable number, four as shown, of slots 65 extending axially therein from the lower end, preferably for a distance about equal to the threaded portion thereof, so that this lower portion of the tubular member is capable of slight contraction and expansion, and the threaded portion of the tubular member and the threaded sleeve 42 are of such relative size that when the lower bearing member 15 is removed from its position within the tubular part 12 the sleeve can be readily screwed on to or off from the part 12, but that when the lower bearing member is forced in to its seated position within the part 12, the lower end of part 12 is forced out against the sleeve thereby locking the sleeve against turning. And to make the lock more positive and secure, the sleeve 42 increases in internal diameter downwardly with a slight taper and the threaded lower portion of the tubular part 12 increases in external diameter downwardly with a similar slight taper when the bearing member 15 is seated therein.

The head portion 10 may be made with the lower portion of the bore of its tubular part 12 of a shape and size to fit the lower bearing member 15—cylindrical when the bearing member is cylindrical—and with the lower threaded portion of the tubular part having a slight downward outward taper, or flare, being then, because of its slots, capable of slight compression to permit the sleeve 42 to be screwed thereon. Most desirably, however, for convenience in production, and especially when die cast, the tubular part 12 is made with its threaded lower portion cylindrical as shown in full lines in Fig. 5, and with the lower portion of its bore, in which a cylindrical lower bearing member is to seat, slightly tapered inward from above downward as shown in full lines in said figure. When the lower bearing member is forced down to its position seated on the shoulder 13, the lower portion of the tubular part is expanded as indicated by dotted lines in Fig. 5, its threaded exterior then having a slight downward flare. A taper of the externally threaded lower portion of the tubular part and of the internally threaded portion of the sleeve of between two or three degrees has been found to answer well with the parts of Dow metal and of about the proportions shown.

Most desirably, the threading of the sleeve 42 does not extend all the way to the inner, or upper end of the sleeve, the unthreaded upper end of the bore of the sleeve being of size to make a snug fit on an unthreaded cylindrical surface 70 of the part 12 above its threaded portion, thus assuring accurate alignment with the head portion of the sleeve and of the clamping member 41 as these parts are screwed in to position and in operation.

When the skirt is of Dow metal or other light-weight alloy, it may be of uniform thickness throughout as shown in Fig. 2, but in order to increase the width of its bearing faces 45 and to increase the strength of the skirt at and near its ends and its resistance to expansion there, and also to permit the main extent of the skirt to be made somewhat thinner, the skirt is most desirably made somewhat thicker at its upper and lower edges and from there tapered down to the thinner intermediate portion, as shown in Fig. 6. With a skirt of light-weight material having its ends so thickened to give wider bearing faces, there is not the same need for providing better wear-resisting faces 46 on the ring-carrying part 11 and on the clamping member 41 by means of the set-in rings 60 and 61 of hard metal, but the provision of such rings is especially desirable with skirts of light-weight metal even when they have thickened ends because of the action of the rings in resisting expansion of the parts in which they are set.

Skirts made of steel or a steel alloy or other relatively strong metal may be, and most desirably should be, substantially thinner than skirts made of the somewhat weaker light weight metal, and because of this, in order that the inclined bearing faces of the skirt shall be of sufficient width, the ends of the skirt are most desirably formed with an inwardly turned reentrant flange 71 as shown in Fig. 7.

The skirt-clamping member 41 is most desirably provided with an oil ring 75 seated in a ring groove from which the usual oil discharge openings 76 lead. The ring-carrying part 11 of the head 10, as shown, carries three compression rings 77, but because of the possibility of close fit and rigidity of the skirt the need for the compression rings is largely reduced, and in some cases it may be desirable not to have the piston provided with compression rings.

As hereinbefore explained, the best angle for the bearing faces 45 of the skirt and bearing faces 46 of the head portion and clamping member varies according to the materials, proportions and operating conditions of the pistons. For skirts of Dow metal in a piston such as shown having its head portion and lower portion also of Dow metal, an angle of about 60° from a plane normal to the axis of the piston has been found satisfactory, and for a steel skirt in such a piston the angle should be somewhat less, such as of the order of 50°.

As will be understood from the foregoing description, pistons according to the present invention have to a marked degree the important advantages of light weight, skirt rigidity and strength, good thermal characteristics, control of skirt expansion, and low oil consumption and high compression, in addition to the features of close skirt fit in cylinder, adjustment of effective skirt diameter, skirt replaceability, and long life. And when the piston is of the ball-and-socket type, it is symmetrical with relation to its longitudinal axis and, therefore, balanced with respect both to weight and to thermal control.

It is to be understood that such terms as "upper" and "lower" and "downward" are used herein in the sense of the head end of the piston being considered the upper end regardless of whether the piston is used in a position in which the head end is uppermost or not.

What is claimed is:

1. A piston, comprising a head portion having a ring-carrying part and a central body part of reduced diameter extending downward below the ring-carrying part and provided with connecting rod bearings, a detachable circumferentially continuous skirt, and an annular skirt-clamping member carried by and adjustable on said downwardly extending body part and cooperating with said ring-carrying part to hold the skirt, the skirt being held solely by engagement of its upper end with said ring-carrying part and its lower end with said clamping member.

2. A piston, comprising a detachable circumferentially continuous skirt, an upper ring-carrying part having an annular bearing face for engaging the upper edge of the skirt, a part having an annular bearing face for engaging the lower edge of the skirt, means for relatively adjusting said parts to clamp the skirt therebetween, and resilient means for locking said parts together in adjusted position.

3. A piston, comprising a head portion having an annular part for engaging the upper end of the skirt, an annular clamping member for engaging the lower end of the skirt, a circumferentially continuous skirt extending between said ring-carrying part and said clamping member, means spaced inward and downward from said annular part of the head portion for adjusting said clamping member relatively to said ring-carrying part to clamp the skirt therebetween, and resilient means for locking said clamping member in adjusted position.

4. A piston, comprising a head portion having an annular part for engaging the upper end of the skirt, an annular clamping member for engaging the lower end of the skirt, a circumferentially continuous skirt extending between said annular part of the head portion and said clamping member, the two ends of the skirt having inwardly facing inclined bearing faces and said annular part of the head portion and said clamping member having annular outwardly facing inclined bearing faces for engaging the bearing faces of the skirt, means for adjusting said clamping member relatively to the head portion to clamp the skirt therebetween and by further adjustment of the clamping member toward the head portion to expand the ends of the skirt.

5. A piston, comprising a head portion having a ring-carrying part and a central body part of reduced diameter extending downward below the ring carrying part and provided with connecting rod bearings, an annular clamping member for engaging the lower end of the skirt detachably connected to said downwardly extending body part by means formed to permit cooling fluid to splash between said downwardly extending part and the skirt, and a circumferentially continuous skirt extending between said ring-carrying part and said clamping member, the skirt being held solely by engagement of its upper end with said ring-carrying part and its lower end with said clamping member.

6. A piston, comprising a head portion having an annular part for engaging the upper end of the skirt and a central downwardly extending part of reduced diameter provided with connecting rod bearings, the lower portion of which downwardly extending part is circular in cross-section and externally threaded; a lower portion having an internally threaded sleeve screwed on said downwardly extending part and an annular clamping member for engaging the lower end of the skirt carried by said sleeve by means formed to permit cooling fluid to splash between said downwardly extending part and the skirt; and a circumferentially continuous skirt extending between said annular part of the head portion and said clamping member.

7. A piston, comprising a head portion having a ring-carrying part and a central downwardly extending part of reduced diameter provided with connecting rod bearings, the lower portion of which downwardly extending part is circular in cross-section and externally threaded; a lower portion having an internally threaded sleeve screwed on said downwardly extending part and an annular clamping member for engaging the lower end of the skirt carried by said sleeve by means formed to permit cooling fluid to splash between said downwardly extending part and the skirt; a circumferentially continuous skirt clamped between the ring-carrying part of the head portion and said clamping member; and a plurality of compression rings set in the ring-carrying part of the head portion, and an oil ring set in said clamping member in a groove having oil discharge openings.

8. A piston, comprising a head portion having an annular part for engaging the upper end of the skirt and a central downwardly extending part of reduced diameter provided with connecting rod bearings, the lower portion of which downwardly extending part is circular in cross-section and externally threaded; a lower portion having an internally threaded sleeve screwed on said downwardly extending part and an annular clamping member for engaging the lower end of the skirt carried by said sleeve by means formed to permit cooling fluid to splash between said downwardly extending part and the skirt; and a circumferentially continuous skirt extending between said annular part of the head portion and said clamping member; the two ends of the skirt having inwardly facing inclined bearing faces, and said annular part of the head portion and said clamping member having annular outwardly facing inclined bearing faces for engaging said bearing faces of the skirt.

9. A piston as claimed in claim 8, in which the skirt is a piece of unflanged tubing bevelled at its ends to provide its bearing faces.

10. A piston as claimed in claim 8, in which the skirt is relatively thick at its ends and tapered down to its thinner intermediate portion, the relatively thick ends being bevelled to provide the inclined bearing faces.

11. A piston as claimed in claim 8, in which the skirt is of light weight metal having a comparatively high coefficient of expansion.

12. A piston as claimed in claim 8, in which the skirt is a piece of thin tubing of strong hard metal having its ends flanged inward and shaped to provide the inclined bearing faces.

13. A piston as claimed in claim 8, in which the threading of the threaded sleeve ends short of its upper end, and said downwardly extending part has above its threaded lower portion an unthreaded cylindrical surface on which the unthreaded upper end of the bore of the sleeve fits snugly, whereby accurate alignment of the clamping member with the head portion is assured.

14. A piston, comprising a head portion having a ring-carrying part and a central downwardly extending part of reduced diameter provided with connecting rod bearings, the lower portion of which downwardly extending part is circular in cross-section and externally threaded; a lower portion having an internally threaded sleeve screwed on said downwardly extending part and an annular clamping member for engaging the lower end of the skirt carried by said sleeve by means formed to permit cooling fluid to splash between said downwardly extending part and the skirt; and a circumferentially continuous skirt clamped between the ring-carrying part of the head portion and said clamping member; the two ends of the skirt having inwardly facing inclined bearing faces, said head portion and said lower portion being of light-weight metal having a comparatively high coefficient of thermal expansion and the lower periphery of the ring-carrying part of the head portion and the upper periphery of the clamping member of the lower portion each having a ring of hard wear-resisting metal set therein, said rings having outwardly facing inclined bearing faces for engaging the bearing faces of the skirt.

15. A piston, comprising a head portion having an annular part for engaging the upper end of the skirt and a central downwardly extending tubular part the diameter of which is substantially less than the inside diameter of the skirt and the lower portion of which is externally threaded, removable upper and lower bearing members for the ball head of a connecting rod in the bore of said tubular part, the lower bearing member fitting said bore and being seated in the lower part thereof; a lower portion having an internally threaded sleeve screwed on said tubular part and an annular clamping member for engaging the lower end of the skirt carried by said sleeve by means formed to permit cooling fluid to splash between said downwardly extending part and the skirt; and a circumferentially continuous skirt clamped between the bearing face of the head portion and said clamping member; the lower portion of said tubular part being longitudinally slotted to permit it to contract when said lower bearing member is removed and being of a size to lock said sleeve in its position of adjustment thereon when expanded by the lower bearing member being seated therein.

16. A piston as claimed in claim 15, in which the threaded lower portion of the downwardly extending tubular part increases in external diameter downwardly with a slight taper when the lower bearing member is seated therein and said threaded sleeve increases in internal diameter downwardly with a slight taper.

17. A piston having a circumferentially continuous skirt which is of slightly greater external diameter at and immediately adjacent to its two ends than at any intermediate points in its length.

18. A piston having a circumferentially continuous skirt which is axially slightly concave externally and of the same external diameter at its two ends.

19. A piston having a separately formed circumferentially continuous skirt and having skirt clamping members for engaging the upper and lower ends of the skirt formed to exert on the ends of the skirt pressure having an outwardly directed radial component whereby the ends of the skirt are slightly expanded.

20. A piston as claimed in claim 14, in which the rings set in the lower periphery of the ring-carrying part of the head portion and the upper periphery of the clamping member are of a metal having a comparatively low coefficient of expansion.

21. A piston, comprising a head portion having a ring-carrying part, and a skirt extending downward from said ring-carrying part, and in which a ring of substantially lower coefficient of expansion than the head portion is set into said ring-carrying part adjacent the upper end of the skirt.

JOHN SHEARMAN DONALDSON.